Nov. 15, 1938.   E. ORSHANSKY, JR   2,136,886
TRANSMISSION
Filed Dec. 11, 1935   2 Sheets-Sheet 1

INVENTOR
Elias Orshansky, Jr.
BY
Duell, Kane + Smart
ATTORNEYS

Patented Nov. 15, 1938

2,136,886

UNITED STATES PATENT OFFICE 2,136,886

TRANSMISSION

Elias Orshansky, Jr., New York, N. Y., assignor to The Acrotorque Company, New Haven, Conn., a corporation of Connecticut Application December 11, 1935, Serial No. 53,866

2 Claims. (Cl. 105—96.2)

This invention relates to a structurally and functionally improved transmission primarily intended to be employed in transmitting a power drive from a driving member or motor to driven members such as the axles of a vehicle.

The present application is a continuation in part of my prior application for patent which is identified in the United States Patent Office records under the Serial Number 25,201, and which was filed on June 6, 1935.

It is an object of the invention to furnish a drive of the type afore noted and which will transmit with maximum efficiency the driving force of the motor to the axles of the vehicles, the drive being particularly useful when employed in association with internal combustion motors and where the driven axle or axles are of a type such as is used in rail vehicles. However, the invention may in certain respects be employed in connection with dirigible road vehicles such as heavy duty trucks, busses, etc. as well as otherwise.

A further object of the invention resides in furnishing an apparatus which will embody relatively few parts each individually simple and rugged in construction, these parts being assembled in the form of a unitary apparatus operating over long periods of time with freedom from difficulties.

With these and other objects in mind, reference is had to the attached sheets of drawings illustrating practical embodiments of the invention, and in which.

Figure 1:
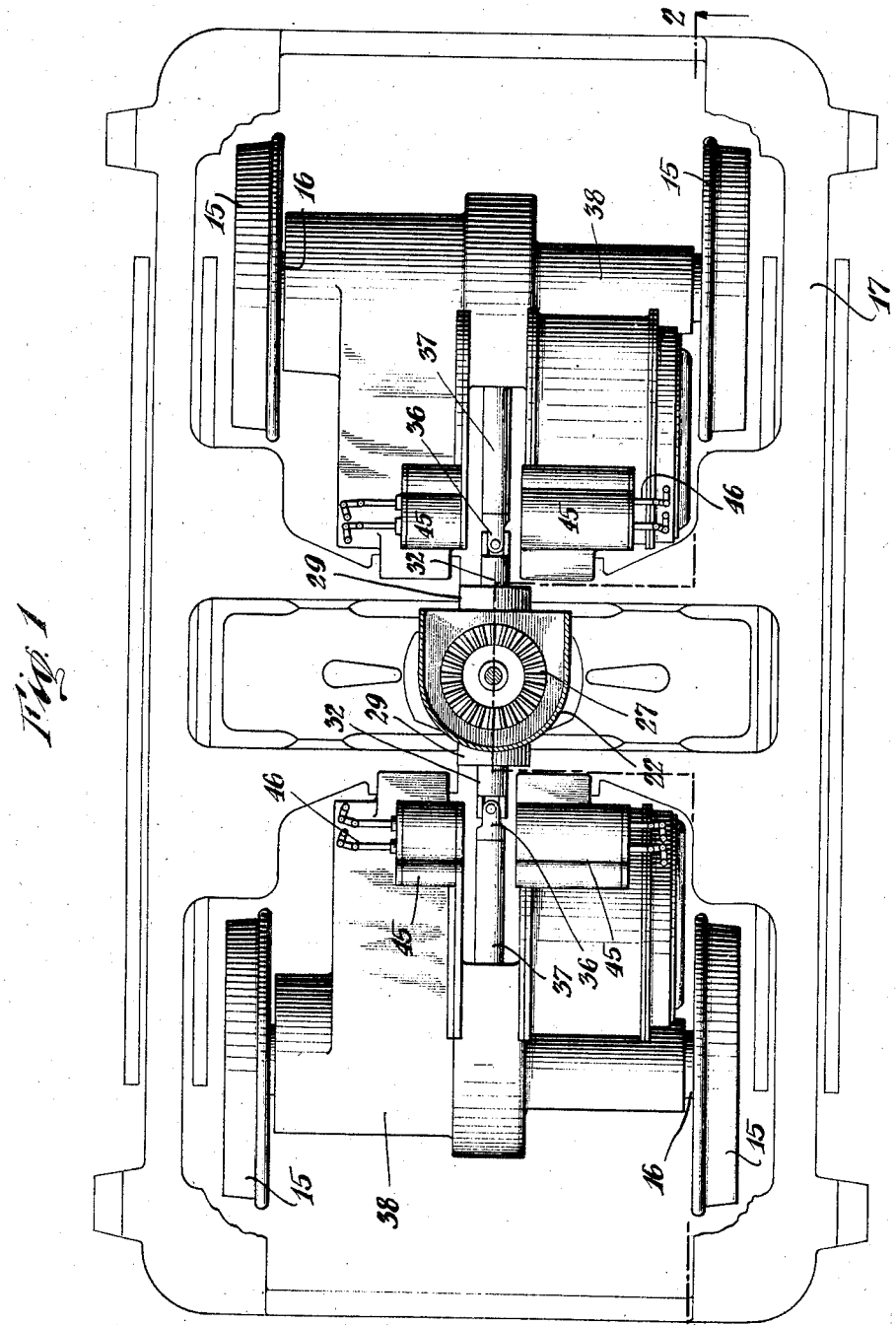
Fig. 1 is a plan view of a truck such as may form a part of the running gear of a locomotive of the internal combustion type and showing in association therewith a transmission constructed in accordance with the teachings of the present invention.
Figure 2:
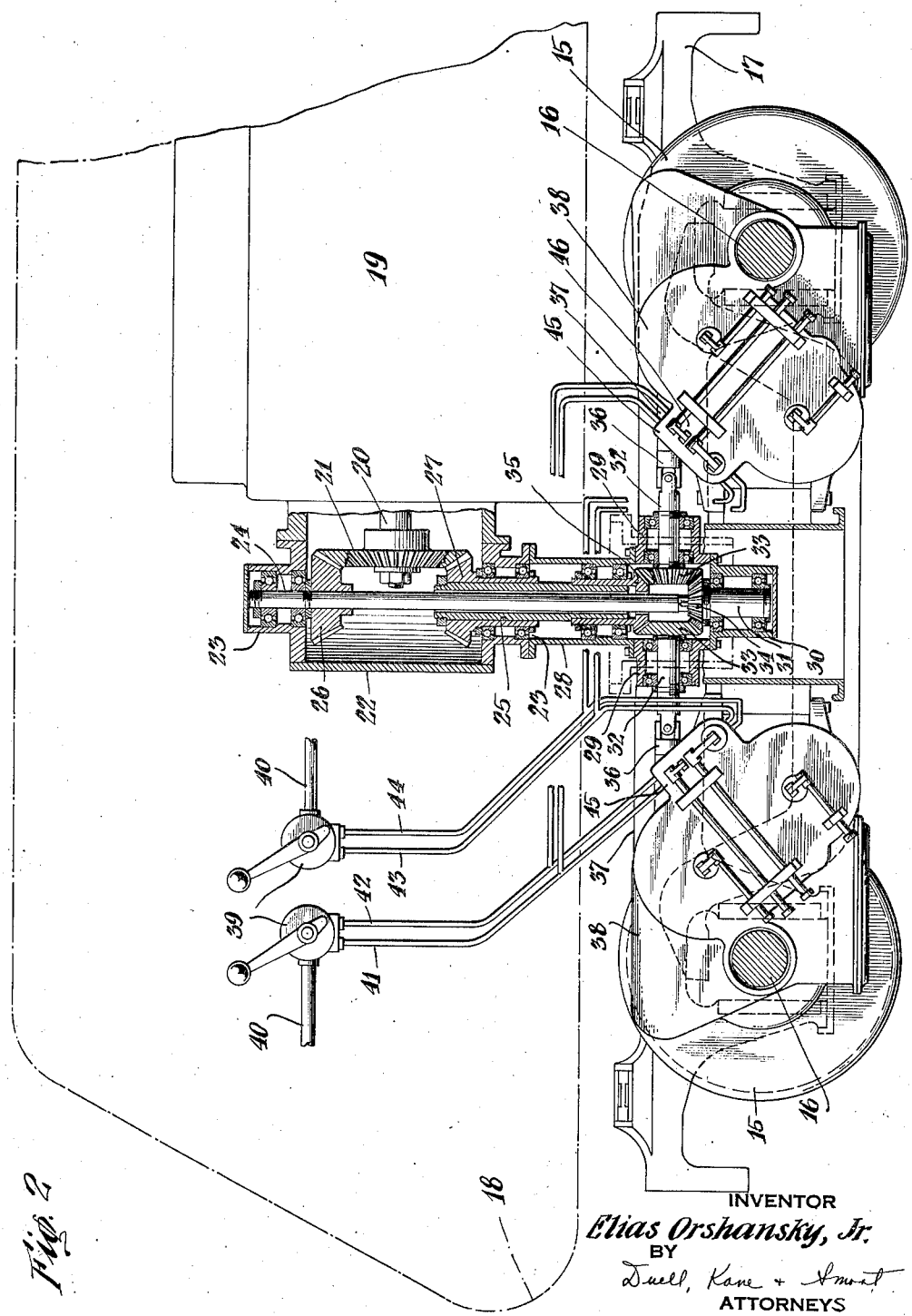
Fig. 2 is a longitudinal sectional view taken along the lines 2—2 and in the direction of the arrows as indicated in Fig. 1.

Referring primarily to Figs. 1 and 2, the numeral 15 indicates flanged wheels which may be supported upon axles 16, suitably mounted upon a truck 17, and to traverse rails (not shown). In lieu of wheels of this nature, any other form of wheels might be employed.

Mounted upon the truck is the body of a vehicle indicated in dot and dash lines at 18. Disposed within this body is a motor 19 which may be of the Diesel type, and this motor serves to rotate, for example, a power shaft 20 to which a beveled gear 21 is secured. A housing 22 may enclose the beveled gear and serve to rotatably support, by means of anti-friction bearings 23, a shaft 24 and a sleeve 25. Attached to this shaft 24 is a beveled gear 26, the teeth of which mesh with gear 21. A similar gear 27 secured to the sleeve 25 also has its teeth in mesh with the teeth of gear 21.

The housing 22 is continued downwardly towards the floor of the gear body or frame in the form of a tube 28 which encloses both the shaft 24 and the sleeve 25. Bearings 23 may be associated with this tube and serve to support and properly mount the shaft and sleeve.

This member is, of course, arranged in line with the center or axis of the truck 17, and it will be observed that the lower ends of the shaft and sleeve extend in the embodiment illustrated in the plane of the truck. At this point the sleeve 28 may be provided with forwardly and rearwardly extending housing portions 29 and may additionally be formed at points below these portions with a downward extension 30. The latter mounts a shaft 31 upon anti-friction bearings, this shaft being in effect a continuation of shaft 24 and being coupled against movement with respect thereto.

Shafts 32 extend through and beyond each of the housing portions 29, and it will be observed that anti-friction bearings may also be suitably associated with these housing portions and shafts. Adjacent their inner ends, each of the shafts 32 mount beveled gears 33, and these mesh, respectively, with a gear 34 secured to the shafts 24 and 31 and a beveled gear 35 secured against movement with respect to the sleeve 25. As especially shown in Fig. 1, each of the shafts 32 may have at its outer end a universal joint 36 of any desired construction, which serves to connect these shafts to shafts 37 extending from transmissions generally indicated at 38.

For a detailed understanding of these transmissions, reference is had to the co-pending application afore referred to. Suffice it to say that they are preferably of the hydraulic type and in which a division of transmitted power occurs between the hydraulic unit and the mechanical unit, the functioning of these units being correlated and dependent upon each other. This is to be regarded merely as explanatory, and as will hereinafter more especially appear, a transmission within the teachings of the present invention might be suitably connected or coupled with other forms of power transmission.

Considering, however, the unit presently under consideration, controls such as those indicated at 39 should preferably be disposed within the vehicle body 18 and have extending from them tubes 40 as well as control lines 41—42 and 43—44, the ends of the control lines extending to the casings 38 and more especially control cylinders 45 which serve to actuate link mechanism 46.

Irrespective of the details of transmission, however, it will be understood that, as shown in Fig. 2, the power transmitted by the motor is divided and passed to the transmissions through gears 26 and 27, as well as gears 33, 34 and 35. In this manner minimum strains will occur and reverse torque effects are created which substantially neutralize each other, it being, of course, appreciated that the truck is free to swing within all reasonable limits with respect to the body.

Thus, among others, the several objects of the invention as afore noted are achieved. It will be appreciated that numerous changes in construction and rearrangements of the parts might be resorted to without departing from the spirit of the invention as defined by the claims.

Having thus described the invention, what is claimed is:

1. A transmission including, in combination, a truck, a plurality of driving axles mounted by said truck, hydraulic transmissions associated one with each of said axles, a body movably supported upon said truck, a prime mover mounted within said body, a driving gear connected to said prime mover, a shaft and sleeve concentrically disposed with respect thereto defining a pivotal connection between said truck and body, gears secured to said sleeve and shaft and engaging with the gear associated with said prime mover, aligned shafts extending from each of said transmissions for driving the latter, gears secured to each of said latter shafts and disposed adjacent the lower ends of said first named shaft and sleeve, and gears secured to said first named shaft and sleeve and adjacent their lower ends to each engage all gears associated with the transmission shafts.

2. A transmission including, in combination, a truck, a plurality of driving axles mounted by said truck, hydraulic transmissions associated one with each of said axles, a body movably supported upon said truck, a prime mover mounted with said body, a driving gear connected to said prime mover, a shaft and sleeve concentrically disposed with respect thereto defining a pivotal connection between said truck and body, gears secured to said sleeve and shaft and engaging with the gear associated with said prime mover, aligned shafts extending from each of said transmissions for driving the latter, gears secured to each of said latter shafts and disposed adjacent the lower ends of said first named shaft and sleeve, gears secured to said first named shaft and sleeve and adjacent their lower ends to each engage all gears associated with the transmission shafts, and control means disposed within said body and common to all of said transmissions to govern the operation of the latter.

ELIAS ORSHANSKY, Jr.